US012774251B2

(12) United States Patent
Burns et al.

(10) Patent No.: US 12,774,251 B2
(45) Date of Patent: Oct. 27, 2026

(54) WATER REDUCING ADMIXTURE FOR STABLE AIR

(71) Applicant: GCP Applied Technologies Inc., Wilmington, MA (US)

(72) Inventors: Elizabeth Burns, Windham, NH (US); Hideo Koyata, Atsugi (JP); Klaus-Alexander Rieder, Beverly, MA (US)

(73) Assignee: GCP Applied Technologies Inc., Malvern, PA (US)

( * ) Notice: Subject to any disclaimer, the term of this patent is extended or adjusted under 35 U.S.C. 154(b) by 733 days.

(21) Appl. No.: 17/778,808

(22) PCT Filed: Nov. 20, 2020

(86) PCT No.: PCT/US2020/061559
§ 371 (c)(1),
(2) Date: May 20, 2022

(87) PCT Pub. No.: WO2021/102294
PCT Pub. Date: May 27, 2021

(65) Prior Publication Data

US 2023/0032346 A1 Feb. 2, 2023

Related U.S. Application Data

(60) Provisional application No. 62/938,728, filed on Nov. 21, 2019.

(51) Int. Cl.

| | |
|---|---|
| ***C04B 28/28*** | (2006.01) |
| *C04B 103/30* | (2006.01) |
| *C04B 103/40* | (2006.01) |

(52) U.S. Cl.
CPC ........ *C04B 28/28* (2013.01); *C04B 2103/304* (2013.01); *C04B 2103/408* (2013.01)

(58) Field of Classification Search
CPC .............. C04B 28/28; C04B 2103/304; C04B 2103/408; C04B 40/0039; C04B 28/02; Y02W 30/91
See application file for complete search history.

(56) References Cited

U.S. PATENT DOCUMENTS

| | | | | |
|---|---|---|---|---|
| 5,393,343 A | 2/1995 | Darwin et al. | | |
| 6,437,027 B1 * | 8/2002 | Isomura | C04B 28/06 | 526/318.42 |

(Continued)

FOREIGN PATENT DOCUMENTS

| | | | |
|---|---|---|---|
| WO | WO-0142162 A1 * | 6/2001 | B01D 19/04 |
| WO | 2007060272 | 5/2007 | |

(Continued)

OTHER PUBLICATIONS

Dodson, "Concrete Admixtures", New York NY 1990, p. 1.

*Primary Examiner* — Anthony J Green
*Assistant Examiner* — Anastasia A. Kuvayskaya
(74) *Attorney, Agent, or Firm* — Armstrong Teasdale LLP

(57) ABSTRACT

The present invention provides exemplary additive compositions and methods whereby hydratable cementitious compositions, such as concrete, can be modified using polycarboxylate type ether or ester cement dispersant polymers of a small size, in combination with at least one alkyl alkoxylate type surface active agent which typically hitherto is considered detergent-like in generating air bubbles (heads of foam) in aqueous environments. The present inventors discovered surprisingly that such agents could be used to control air content in plastic concrete mixes in combination with the polycarboxylate type ether or ester cement dispersant polymer.

6 Claims, 5 Drawing Sheets

– AIRtrac™ Air Management System • Type A air meter

(56) References Cited

U.S. PATENT DOCUMENTS

| | | | |
|---|---|---|---|
| 8,020,431 B2 | 9/2011 | Cooley et al. | |
| 8,118,473 B2 | 2/2012 | Compton et al. | |
| 8,311,678 B2 | 11/2012 | Koehler et al. | |
| 8,491,717 B2 | 7/2013 | Koehler et al. | |
| 8,727,604 B2 | 5/2014 | Compton et al. | |
| 8,764,273 B2 | 7/2014 | Koehler et al. | |
| 8,858,061 B2 | 10/2014 | Berman | |
| 8,989,905 B2 | 3/2015 | Sostaric et al. | |
| 9,199,391 B2 | 12/2015 | Beaupre et al. | |
| 10,266,449 B2 | 4/2019 | Kuo et al. | |
| 2004/0149175 A1 | 8/2004 | Zhang et al. | |
| 2009/0037026 A1 | 2/2009 | Sostaric et al. | |
| 2009/0171595 A1 | 7/2009 | Benegas | |
| 2009/0312460 A1* | 12/2009 | Lorenz | C08F 220/26<br>526/273 |
| 2012/0016523 A1 | 1/2012 | Koehler et al. | |
| 2012/0214901 A1* | 8/2012 | Bury | C04B 28/02<br>524/4 |
| 2014/0104066 A1 | 4/2014 | Jordan et al. | |
| 2014/0104972 A1 | 4/2014 | Roberts et al. | |
| 2015/0051737 A1 | 2/2015 | Berman | |
| 2017/0008800 A1 | 1/2017 | Kuo et al. | |
| 2023/0032346 A1* | 2/2023 | Burns | C04B 40/0039 |

FOREIGN PATENT DOCUMENTS

| | | |
|---|---|---|
| WO | 2015073825 | 5/2015 |
| WO | 2015160610 | 10/2015 |
| WO | 2018169782 | 9/2018 |

* cited by examiner

WATER REDUCING ADMIXTURE FOR STABLE AIR

FIELD OF THE INVENTION

The present invention relates to modification of hydratable cementitious compositions using polycarboxylate-type cement dispersant; and, more particularly, to additive compositions and methods whereby air-entrained concrete can have stable air content and manageable fluidity even when containing high surface area components that adversely affect the dispersant dosage.

BACKGROUND OF THE INVENTION

A concrete mixture typically comprises a cementitious binder (e.g., ordinary Portland cement often blended with limestone, fly ash, granulated blast furnace slag, or other pozzolan), fine aggregate (e.g., natural and/or manufactured sand), coarse aggregate (e.g., gravel, crushed stone), water, and, optionally though typically, one or more chemical admixtures for modifying a property of the concrete in its plastic or hardened state. It is common practice to add chemical admixtures for dispersing cement particles, such as water reducing admixtures (e.g., plasticizing cement dispersants, sometimes termed "superplasticizers," whereby 12% or more of water can be reduced for achieving a desired workability or "slump" level in the concrete); or to add set accelerators and/or set retarders to adjust fluidity of the concrete or to manipulate the setting or hardening of the concrete. In climates where freezing temperatures are reached, it is common to use one or more air entraining agents (AEA) to create small bubbles that provide protection to the hardened concrete from the freeze/thaw cycles.

The AEA is added to fluid (plastic) concrete to obtain desired properties when the concrete is in the hardened state. In ready-mix operations, the concrete mix is mixed at a plant within a ready-mix delivery truck and transported to the construction site at which it is poured or pumped into place. There is often a significant interval of time between when the concrete is made and when it is placed at the site. The plant may located at a distance from the job site; or it may be located in an urban area where traffic creates delays for the delivery operation; or there may be delays at the site that cause the concrete to be held in the truck for extended periods. If the time elapsed is significant, the slump (or workability) of the concrete decreases significantly, and water will be added to re-temper (fluidify) the concrete. Ready-mix trucks have rotatable drums for mixing the concrete, and these drums usually have two mixing blades mounted spirally on the inner drum wall about the rotational axis in the manner of an Archimedean screw. Rotation in one direction pushes the concrete against a closed end of the drum with great intensity, while rotation in the other direction pushes the concrete towards the open end of the drum from which it can be discharged.

When components for the concrete are first loaded into the mixer drum, the operators typically rotate the drum quickly to force the concrete components towards the closed end of the drum, intensely mixing and creating the plastic concrete. Intense mixing will also occur before placement of the concrete, because water is usually added to facilitate pouring and finishing of the concrete at the jobsite. In transit or during holds, the mixer drum of the delivery truck will otherwise be rotated slowly.

It is desirable for concrete producer or delivery truck operators to add air-entraining agents (AEA), e.g., tall oil derivative, and/or polycarboxylate-type cement dispersants, which are known to entrap air when the concrete load is first batched, so that a proper air content can be established in the concrete. It is desirable that air content remains constant over time and in spite of mixer drum speed variations.

Adding to the difficulty of creating a stable and proper air system, however, is the fact that the aggregate (stone and sand) used for making the concrete mix can vary from day to day. The expense of shipping these materials forces concrete producers to use local sources, which means that a given concrete mix design will experience local variations in workability as well as air properties. In some geographical regions, the sand contains high surface area materials, such as clays or zeolites, that can absorb polycarboxylate type plasticizers and/or AEAs, and contribute to a variability in the workability and air properties of the concrete.

Air content in plastic concrete can be quantitatively described in terms of "percent air" measured using air meters (See e.g. ASTM C231, ASTM C173). Air contents in the range of 4% to 7% are considered appropriate for freeze/thaw protection in climates that experience freezing temperatures. However, the air content of a given mix can fluctuate widely due to a number of factors, such as described above, thereby decreasing protection. If air content is too low, there may be little or no freeze-thaw protection. If air content is too high, the concrete may suffer from low compressive strength and not meet the specification for the project. It is desirable therefore to produce concrete within the range of 4% to 7% air content.

In U.S. Pat. No. 10,266,449 (owned by the common assignee hereof), Kuo et al. disclosed that polycarboxylate polymers having high molecular weight and low ratio of acid-to-polyoxyalkylene groups could be used to mitigate the effects of clay born in aggregates, thereby beneficiating the performance of construction materials, such as concrete, which contain the clay-bearing aggregates.

In WO2018/169782 A1 (owned by the common assignee hereof), Debny et al. disclosed a method for mitigating the adverse impact of clay impurities in construction aggregates and cementitious compositions using such aggregates.

The foregoing clay-mitigation approaches, however, do not consider simultaneously the needs for clay mitigation and air management issues due to fluctuations in material quality and mix process conditions. The present inventors believe that a novel and inventive admixture composition and method for attaining a proper air system in hydratable cementitious mixes, especially in concrete made with aggregates having high surface materials (e.g., clays and/or zeolites) that can adversely affect dosage of dispersants, are desirable.

SUMMARY OF THE INVENTION

In surmounting the disadvantages of the prior art, the present invention provides a composition and method for achieving a hydratable cementitious material, such as concrete or mortar, using at least one polycarboxylate-based cement dispersant in combination with specific surface active agents, to achieve a controlled air content despite changing mixing conditions.

In one exemplary embodiment, the present invention provides manageable air-entrained concrete under conditions of varying sand composition, including sand that includes varying amount of high surface area materials (e.g., clays, zeolites).

In another exemplary embodiment, the present invention provides a concrete mix having an air content in the range of 3% to 8%, more preferably 4% to 7%, and most preferably 5% to 6%. The air content will be preferably be stable over time in spite of changes in mixer speeds and have a low air stability index (or "ASI" as discussed herein) for at least 30 to 90 minutes.

Exemplary concrete mix designs, additive compositions, and methods of the invention involve the use of at least one polycarboxylate ether or ester polymer cement dispersant and at least one alkyl ether polyalkoxylate surface active agent for modifying air (e.g., reducing entrapped air), modifying air spacing, or both, in hydratable cementitious compositions such as concrete. While use of polycarboxlate polymers and ethoxylate-type surfactants are known generally, the present invention provides an air system within plastic concrete mixes that is highly stable, particularly when the polycarboxyate ether or ester dispersant polymer or polymers has a number-average molecular weight of less than 10,000; and the surface active agent (or "surfactant") used by the present inventors is an alkyl ethoxylate composition comprising a C5-C16 branched or linear alkyl chains and 8-20 alkylene oxides. The present inventors surprisingly discovered that such surfactants, previously considered to be air foaming detergents, could be used to control the air content when used with air entrapping polycarboxylate dispersant polymers. Preferably, exemplary surfactants are fully water miscible.

An exemplary additive composition of the invention comprises:

(A) at least one polycarboxylate ether or ester cement dispersant polymer for plasticizing a hydratable cementitious composition, the at least one polycarboxylate ether or ester cement dispersant polymer having a number-average molecular weight less than 10,000 and being present in the amount of 10-50 percent by dry weight based on total weight of the additive composition;

(B) at least one alkyl alkoxylate surface active agent for controlling air when the additive composition is mixed into a hydratable cementitious composition, the at least one alkyl alkoxylate surface active agent comprising C5-C16 branched or linear alkyl chains and 8-20 alkylene oxide groups and being present in the amount of 1-10 percent by dry weight based on total weight of the additive composition; and (C) water in an amount sufficient to carry the at least one polycarboxylate ether or ester cement dispersant polymer and the at least one alkyl alkoxylate surface active agent together in the form of a liquid additive composition.

The invention also provides exemplary methods comprising introducing the additive components into a hydratable cementitious composition.

An exemplary method of the invention comprises:

combining, into a hydratable cementitious composition or the components thereof (e.g., cement, aggregates, water), (A) at least one polycarboxylate ether or ester cement dispersant polymer for plasticizing the hydratable cementitious composition, the at least one polycarboxylate ether or ester cement dispersant polymer having an number-average molecular weight less than 10,000, the amount of the at least one polycarboxylate ether or ester cement dispersant polymer being combined in the amount of 0.01-0.20 percent by dry weight based on weight of cement in the hydratable cementitious composition (and, more preferably, 0.03-0.15 percent by dry weight based on weight of cement in the hydratable cementitious composition; and, most preferably, 0.04-0.1 percent by dry weight based on weight of cement in the hydratable cementitious composition); and (B) at least one alkyl alkoxylate surface active agent for controlling air content in the hydratable cementitious composition, the at least one alkyl alkoxylate surface active agent comprising C5-C16 branched or linear alkyl chains and 8-20 alkylene oxide groups, the amount of the at least one alkyl alkoxylate surface active agent being combined in the amount of 0.01-0.15 pounds per cubic yard of cementitious composition (more preferably, 0.03-0.12 pounds per cubic yard of cementitious composition; and, most preferably, 0.05-0.10 pounds per cubic yard of cementitious composition).

The present invention also provides a concrete or mortar composition and structure made from the above-described process and additive composition.

Further advantages and benefits of the present invention are described in other detail hereinafter.

BRIEF DESCRIPTION OF THE DRAWINGS

An appreciation of the benefits and features of the invention may be more readily comprehended when the following written description of preferred embodiments is considered in conjunction with the drawings, wherein.

DETAILED DESCRIPTION OF EXEMPLARY EMBODIMENTS

Figure 1:
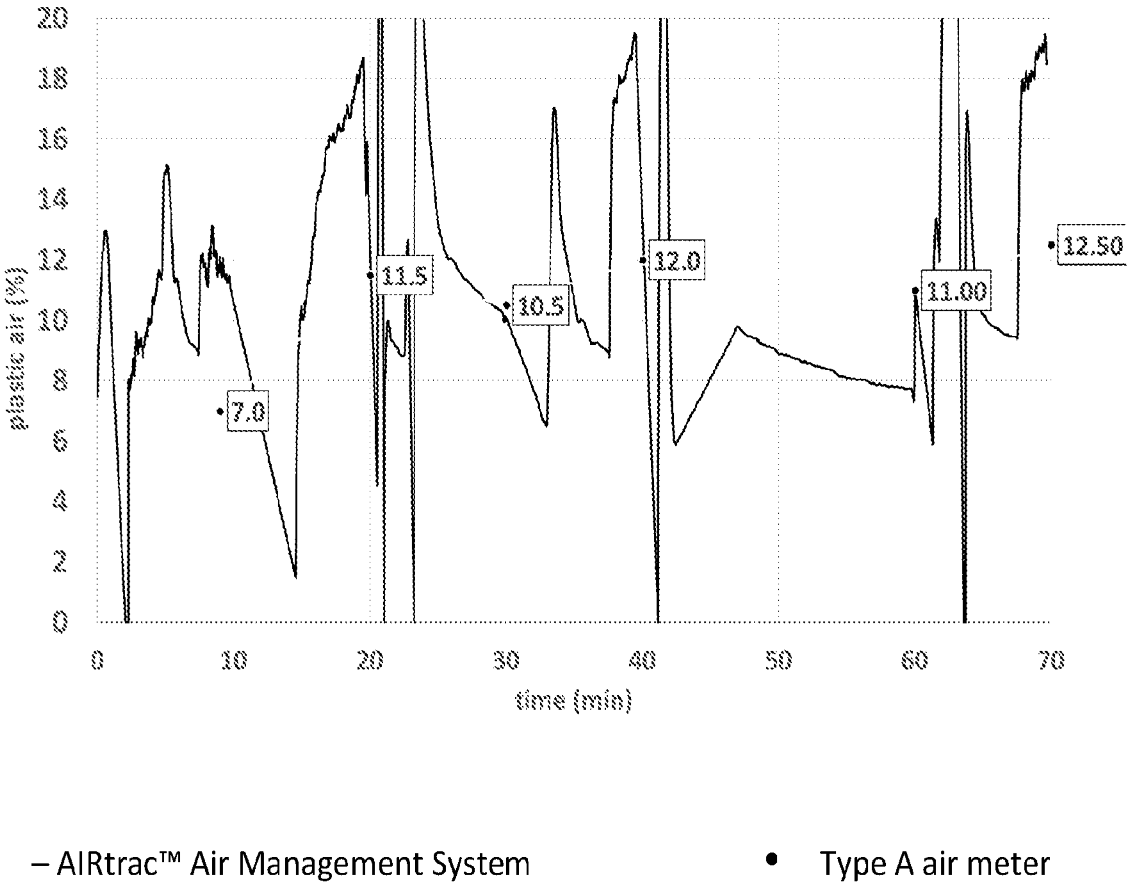
FIG. 1 is a graphic illustration of air content (percentage) of a REFERENCE plastic hydratable cementitious composition (e.g., concrete) monitored as a function of time (minutes).

The term "cement" as used herein includes hydratable cement such as Portland cement which is produced by pulverizing clinker consisting of hydraulic calcium silicates, aluminates and aluminoferrites, and one or more forms of calcium sulfate (e.g., gypsum) as an interground additive. Typically, Portland cement is combined with one or more supplemental cementitious materials, such as fly ash, granulated blast furnace slag, limestone, natural pozzolans, or mixtures thereof, and provided as a blend. Thus, "cement" and "cement binder" may also include supplemental cementitious materials, which have been inter-ground with Portland cement during manufacture at a cement plant, or which may be added separately at the concrete plant.

The term "cementitious" may be used herein to refer to materials that comprise cement (e.g., Portland cement) or which otherwise function as a binder to hold together fine aggregates (e.g., sand) and coarse aggregates (e.g., crushed gravel, stone) which are used for constituting concrete.

The term "hydratable" as used herein is intended to refer to cement or cementitious materials that are hardened by chemical interaction with water. Portland cement clinker is a partially fused mass primarily composed of hydratable calcium silicates. The calcium silicates are essentially a mixture of tricalcium silicate (3CaO.SiO2 or "$C_3S$" in cement chemists' notation) and dicalcium silicate (2CaO-.SiO2, "$C_2S$") in which the former is the dominant form, with lesser amounts of tricalcium aluminate (3CaO.Al2O3, "$C_3A$") and tetracalcium aluminoferrite (4CaO.Al2O3Fe2O3, "$C_4AF$"). See e.g., Dodson, Vance H., Concrete Admixtures (Van Nostrand Reinhold, New York, N.Y. 1990), page 1.

The term "concrete" typically refers to hydratable cementitious mixtures comprising cement, fine aggregate (e.g., sand), and usually coarse aggregate (e.g., crushed gravel, stone), and optionally one or more chemical admixtures. Chemical admixtures are added to concrete for purposes of modifying any number of properties, including, by way of example, reducing the need for water (e.g., plasticizing, increasing fluidity), controlling the setting of concrete (e.g., set accelerating, set retarding), managing air content and quality (e.g., air entraining agents, air detraining agents), shrinkage reduction, corrosion inhibition, and other properties. While a "mortar" is typically used to refer to cement and small aggregate (e.g., sand) alone, the present inventors will use "concrete" herein to refer to hydratable cementitious compositions having aggregates of small or small plus coarse aggregates.

The term "aggregate" as used herein shall mean and refer to sand or stone particles used for construction materials such as concrete, mortar, and asphalt, and this typically involves granular particles of average size between 0 and 50 mm. Aggregates may comprise calciferous, siliceous or siliceous limestone minerals. Such aggregates may be natural sand (e.g., derived from glacial, alluvial, or marine deposits which are typically weathered such that the particles have smooth surfaces) or may be of the "manufactured" type, which are made using mechanical crushers or grinding devices.

More specifically, the term "fine aggregate" or "sand" shall refer to aggregates for use in construction materials that meet requirements of ASTM C33/C33M-16 or AASHTO M6-13/M43-05. These requirements include, for example, grading limits that require 100% of the fine aggregate to pass through a ⅜ inch sieve.

Furthermore, the term, "coarse aggregate" or "stone" shall refer to aggregates for use in construction materials, which meet requirements of ASTM C33/C33M-18 or AASHTO M80-13. These requirements also include specific grading limits.

The term "air content" as used herein shall refer to the percent air reported from any of several air-measurement systems, including those meeting ASTM type A and B, roll meter, and the AIRTRAC® monitoring system available from GCP Applied Technologies Inc. of Cambridge, Mass. USA. (AIRTRAC® is a registered trademark of CiDRA Concrete Systems Inc., North Wallingford, Conn.).

Air may be entrapped and/or entrained in plastic cementitious mixtures such as concrete. As used herein, the term "entrapped" will refer to air that is enfolded into the concrete by the mechanical action of mixing, such as in a rotating mixer drum. Certain compositions, such as polycarboxylate type ether or ester cement dispersant polymers, increase the amount of entrapped air. It is believed that entrapped air bubbles have an average size of 0.3-0.5 mm in concrete. As used herein, the term "entrained" will refer to fine air bubbles stabilized by chemical air entraining agents (AEAs), such as Vinsol® resins, alkyl sulfonates, tall oil derivatives, and other AEAs. Entrained air bubbles are typically 5-100 um in average diameter.

The terms "control" or "manage" as used herein shall refer to the use of surface active agents in plastic hydratable cementitious compositions such as concrete, in accordance with various embodiments of the present invention, depending upon circumstances. If no chemical air entraining agent (AEA) is used in the concrete, then "control" or "manage" shall mean to reduce the amount of entrapped air within the concrete. If an AEA is used, then "control" or "manage" shall refer to stabilizing the entrained air. Moreover, the term "stabilizing" refers to substantially retaining air content within the concrete mix, despite changes in mixing rate (intensity), during the time window beginning from when the concrete is first batched into a mixer and ending when the concrete is discharged from the mixer and used (e.g., poured or pumped as ready-mix at the delivery site, or poured into a form at a precast manufacturing site).

Preferably, although not necessarily, the concrete mixes contemplated for use in the invention are batched, delivered, monitored, and poured from a concrete mixer truck having a rotatable mixer drum that is monitored using an automated concrete slump management (monitoring) system, which monitors slump or other rheological properties. Such slump monitoring systems are commercially available from Verifi LLC, a subsidiary of GCP Applied Technologies Inc., 62 Whittemore Avenue, Cambridge, Mass., USA. Various automated concrete monitoring methods and systems using one or more hydraulic pressure sensors are described in various literature: e.g., U.S. Pat. Nos. 8,020,431; 8,118,473; 8,311,678; 8,491,717; 8,727,604; 8,764,273; 8,989,905; US Publ. No. US 2009/0037026A1); US Publ. No. 2012/0016523 A1; US Publ. No. 2014/0104066 A1; US Publ. No. 2014/0104972; WO2015/160610 A1; WO2015073825 A1; and other publications. Alternatively, the slump monitoring system may be based on use of a force sensor (e.g., strain gauge) mounted within the mixer drum. Examples are disclosed in U.S. Pat. No. 8,848,061 and US Publication No. 2015/0051737 A1 of Berman (owned by GCP), U.S. Pat. No. 9,199,391 of Denis Beaupre et al. (I.B.B. Rheologie Inc.), or US Publication No. 2009/0171595 and WO 2007/060272 of Benegas.

The present invention provides exemplary admixture compositions for achieving modifying workability (fluidity) and maintaining proper and stable air content and/or quality (e.g., air void spacing) within hydratable compositions, such as concrete, as well as exemplary methods for achieving such properties in concrete, and concrete materials made from the admixtures and methods herein described.

In a first exemplary embodiment, the present invention provides an additive composition for modifying a hydratable cementitious composition, comprising:

(A) at least one polycarboxylate ether or ester cement dispersant polymer for plasticizing the hydratable cementitious composition (e.g., concrete), the at least one polycarboxylate ether or ester cement dispersant polymer having a number-average molecular weight less than 10,000 and being present in the amount of 10-50 percent by dry weight based on total weight of the additive composition;

(B) at least one alkyl alkoxylate surface active agent for controlling air when the additive composition is mixed in the hydratable cementitious composition (e.g., concrete), the at least one alkyl alkoxylate surface active agent comprising C5-C16 branched or linear alkyl chains and 8-20 alkylene oxide groups and being present in the amount of 1-10 percent by dry weight based on total weight of the additive composition; and (C) water in an amount sufficient to carry the at least one polycarboxylate ether or ester cement dispersant polymer and the at least one alkyl alkoxylate surface active agent together in the form of a liquid additive composition. (In preferred example embodiments, the at least one alkyl alkoxylate surface active agent is fully-miscible and thus dissolved within the water carrier of a liquid additive composition).

The present inventors have discovered that, surprisingly, the use of alkyl alkoxylate surface active agent, a type of which is sold as wetting and detergent aids having high foaming ability, is unexpectedly effective in generating a concrete with controlled (e.g., stable) air content when used in combination with certain sized polycarboxylate-type ether or ester cement dispersants.

In a first aspect of the above-described exemplary embodiment, the alkyl alkoxylate surface active agents can be used in higher amounts as compared to conventional defoamers used in the concrete industry (See e.g., defoamers described in references mentioned in the Background Section).

In a second aspect of the above-described exemplary embodiment, the alkyl alkoxylate surface active agents are fully-water miscible and generate a head of foam when incorporated by themselves into water and shaken (as will be discussed further hereinafter).

In a second exemplary embodiment, which may be based upon the first exemplary embodiment described above, the invention provides an additive composition, wherein the at least one polycarboxylate ether or ester cement dispersant polymer is copolymerized from monomers comprising (i) at least one acrylic acid, methacrylic acid, maleic anhydride, or mixture thereof; and (ii) a polyethylene oxide or polypropylene/polyethylene oxide macromonomer having a number-average molecular weight in the range of 300-10,000 and at least one polymerizable group chosen from acrylate or methacrylate esters, vinyl ethers, allyl ethers, isoprenyl ethers, and vinylbutyl ethers.

In a third exemplary embodiment, which may be based upon the first or second exemplary embodiments described above, the invention provides an additive composition, wherein the at least one polycarboxylate ether or ester cement dispersant polymer is obtained by copolymerizing monomer components (A), (B), (C), and, optionally, monomer component (D):

(A) a first polyoxyalkylene monomer represented by structural formula:

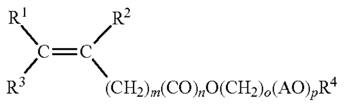

wherein $R^1$ and $R^2$ individually represent hydrogen atom or methyl group; $R^3$ represents hydrogen or —COOM group wherein M represents a hydrogen atom or an alkali metal; AO represents oxyalkylene group having 2 to 4 carbon atoms (preferably 2 carbon atoms) or mixtures thereof; "m" represents an integer of 0 to 2; "n" represents an integer of 0 or 1; "o" represents an integer of 0 to 4; "p" represents an average number of oxyalkylene groups and is an integer from 5 to 35; and $R^4$ represents a hydrogen atom or $C_1$ to $C_4$ alkyl group;

(B) a second polyoxyalkylene monomer represented by structural formula:

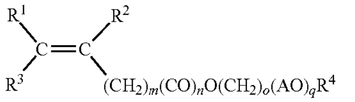

wherein $R^1$ and $R^2$ individually represent hydrogen atom or methyl group; $R^3$ represents hydrogen or —COOM group wherein M represents a hydrogen atom or an alkali metal; AO represents an oxyalkylene group having 2 to 4 carbon atoms (preferably 2 carbon atoms) or mixtures thereof; "m" represents an integer of 0 to 2; "n" represents an integer of 0 or 1; "o" represents an integer of 0 to 4; "q" represents an average number of oxyalkylene groups and is an integer from 20 to 200; and $R^4$ represents a hydrogen atom or $C_1$ to $C_4$ alkyl group;

(C) an unsaturated carboxylic acid monomer represented by structural formula:

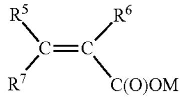

wherein $R^5$ and $R^6$ individually represent hydrogen atom or methyl group; R' represents hydrogen atom, $C(O)OR^8$, or C(O)NH $R^8$ wherein $R^8$ represents a $C_1$ to $C_4$ alkyl group, and M represents a hydrogen atom or an alkali metal; and, optionally, (D) an unsaturated, water-soluble monomer represented by structural formula:

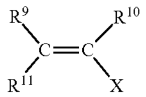

wherein $R^9$, $R^{10}$, and $R^{11}$ each independently represent a hydrogen atom, methyl group or C(O)OH; X represents $C(O)NH_2$, $C(O)NHR^{12}$, $C(O)NR^{13}R^{14}$, O—$R^{15}$, $SO_3H$, $C_6H_4SO_3H$, or $C(O)NHC(CH_3)_2CH_2SO_3H$, or mixture thereof, wherein $R^{12}$, $R^{13}$, $R^{14}$, and $R^{15}$ each independently represent a $C_1$ to $C_5$ alkyl group; and wherein the molar ratio of component (A) to component (B) is from 15:85 to 85:15, and further wherein the molar ratio of component (C) to the sum of component (A) and component (B) is 90:10 to 50:50.

The present inventors believe that alternative polymer compositions may be useful in the invention, so long as they are within the molecular weight range, as further discussed below.

In a fourth exemplary embodiment, which may be based upon the first through third exemplary embodiments described above, the invention provides an additive composition, wherein the at least one polycarboxylate ether or ester cement dispersant polymer formed from components (A), (B), (C), and optionally (D), has a number-average molecular weight in the range of about 5,000 and 10,000 Daltons. This number-average molecular weight can be measured by known means, including gel permeation chromatography (GPC) using polyethylene glycol (PEG) as standards and the following separation columns: ULTRAHYDROGEL™ 1000, ULTRAHYDROGEL™ 250, and ULTRAHYDROGEL™ 120 columns. The GPC conditions may include, for example: 1% aqueous potassium nitrate as elution solvent, flow rate of 0.6 mL/min., injection volume of 80 μL, column temperature at 35 degrees Celsius, and using refractive index detection.

Defoaming agents used in concrete admixtures are typically hydrophobic, and have low HLB values and poor water solubility. Examples are: mineral oil based defoaming agents, for example: kerosene and liquid paraffin; oils-and-fats based defoaming agents, for example: animal and plant oils, sesame oil, castor oil and their alkylene oxide adducts; fatty acid based ester defoaming agents, for example: oleic acid, stearic add and their alkylene oxide adducts; fatty acid ester based defoaming agents, for example: glycerol monoricinolate, alkenyl succinic acid derivatives, sorbitol monolaurate, sorbitol trioleate, and natural wax; oxyalkylene base defoaming agents, for example, block and random copolymers of poly(oxyethylene) and poly(oxypropylene) such as the PLURONIC™ materials available from BASF; (poly) oxyalkyl ethers such as diethylene glycol heptyl ether, polyoxyethylene oleyl ether, polyoxypropylene butyl ether, polyoxyethylene polyoxypropylene 2-ethylhexyl ether, and adducts of oxyethylene oxypropylene to higher alcohols with 12 to 14 carbon atoms; (poly)oxyalkylene (alkyl) aryl ethers such as polyoxypropylene phenyl ether and polyoxyethylene nonyl phenyl ether; acetylene ethers as formed by addition polymerization of alkylene oxide to acetylene alcohols such as 2,4,7,9-tetramethyl-5-decyne-4,7-diol, 2,5-dimethyl-3-hexyne-2,5-diol, and 3-methyl-1-butyn-3-ol; (poly)oxyalkylene fatty acid esters such as diethylene glycol oleic acid ester, diethylene glycol lauric acid ester, and ethylene glycol distearic acid; (poly)oxyalkylene sorbitan fatty acid esters such as (poly)oxyethylene sorbitan monolauric acid ester and (poly)oxyethylene sorbitan trioleic acid ester; (poly)oxyalkylene alkyl (aryl) ether sulfuric acid ester salts such as sodium polyoxypropylene methyl ether sulfate, and sodium polyoxyethylene dodecylphenol ether sulfate; (poly)oxyalkylene alkyl phosphoric acid esters such as (poly)oxyethylene stearyl phosphate; (poly)oxyalkylene alkylamines such as polyoxyethylene laurylamine; and polyoxyalkylene amide; alcohol base defoaming agents, for example: octyl alcohol, hexadecyl alcohol, acetylene alcohol, and glycols; amide base defoaming agents, for example: acrylate polyamines; phosphoric acid ester base defoaming agents, for example: tributyl phosphate and sodium octyl phosphate; metal soap base defoaming agents, for example: aluminum stearate and calcium oleate; silicone base defoaming agents, for example: dimethyl silicone oils, silicone pastes, silicone emulsions, organic-denatured polysiloxanes (polyorganosiloxanes such as dimethyl polysiloxane), and fluorosilicone oils.

Although the list of defoamers commonly known in the concrete industry is extensive, and includes alkyl alkoxylates, the present inventors have discovered surprisingly that there is a subset of alkyl alkoxylate surfactants that unexpectedly and beneficially help to control the air content in a concrete in which a certain sized polycarboxylate-type ether or ester cement dispersant polymer is employed in accordance with the invention. The present inventors discovered that exemplary alkyl alkoxylate surface active agents contemplated for use in the present invention comprise linear or branched alkyl groups having from eight to fourteen carbons and three to fifteen ethoxylate groups, with optionally less than two propoxylate groups.

The present inventors believe that surface active agents having the above-described structure have not been previously used for controlling air content in concrete admixtures. This is because such materials are typically sold as "high foaming" detergents, and will generate a head of foam if shaken in water. Thus, using such high foaming agents in concrete to control air content otherwise entrapped by a polycarboxylate-type cement dispersant polymer is very counter-intuitive. Furthermore, these surface active agents are fully water-soluble, and are most effective when used in the range of 2 to 30 percent by weight as compared to the weight of the polycarboxylate dispersant with which it is used. Typical defoamers are used in an amount between 0.5 and 5 percent weight based on polycarboxylate dispersant. Thus, the present inventors were surprised when they employed surface active agents that otherwise cause foaming when mixed in water, and when they unexpectedly discovered that with certain sized polycarboxylate dispersants such agents were seen to control air content in plastic concrete mixes (which are, after all, aqueous slurry systems and which are subjected to very intense mixing during delivery).

As used herein, the phrase "water-soluble" when used to refer to the behavior of the surface active agent in water means and refers to the fact that at various concentrations, in the range of 25 to 75 percent by weight in water, does not display phase separation for an extended period after mixing. This is because the agents are water-soluble and exist in a single phase at ambient temperatures, as will be illustrated in examples further discussed herein.

Moreover, as mentioned above, these alkyl alkoxylate based agents were surprisingly found to be particularly effective when used with a very small subset of polycarboxylate type cement dispersants, namely, those having number-average molecular weights of less than 10,000 (as can be determined using standard GPC software packages).

In a fifth exemplary embodiment, the invention provides a method for modifying concrete, comprising: combining, into a concrete mix or the components thereof, an additive composition in accordance with any of the second through fourth exemplary embodiments as described above.

In a sixth exemplary embodiment, the invention provides a concrete comprising a cement, aggregate, and additive composition according with any of the second through fourth exemplary embodiments as described above.

In a seventh exemplary embodiment, the invention provides a method for modifying a hydratable cementitious composition (e.g., concrete), comprising:

combining, into the hydratable cementitious composition or the components thereof, (A) at least one polycarboxylate ether or ester cement dispersant polymer for plasticizing the hydratable cementitious composition, the at least one polycarboxylate ether or ester cement dispersant polymer having a number-average molecular weight less than 10,000, the amount of the at least one polycarboxylate ether or ester cement dispersant polymer being combined in the amount of 0.01-0.20 percent by dry weight based on weight of cement in the hydratable cementitious composition (and, more preferably, 0.03-0.15 percent by dry weight; and, most preferably, 0.04-0.1 percent by dry weight based on weight of cement in the hydratable cementitious composition); and (B) at least one alkyl alkoxylate surface active agent for controlling air content in the hydratable cementitious composition, the at least one alkyl alkoxylate surface active agent comprising C5-C16 branched or linear alkyl chain or chains and 8-20 alkylene oxide groups, the at least one alkyl alkoxylate surface active agent being combined in the amount of 0.01-0.15 pounds per cubic yard of hydratable cementitious composition (more preferably, 0.03-0.12 pounds per cubic yard of hydratable cementitious composition; and, most preferably, 0.05-0.10 pounds per cubic yard of hydratable cementitious composition).

In a first aspect of the seventh exemplary embodiment, the at least one alkyl alkoxylate surface active agent is water-soluble and does not demonstrate phase separation when mixed into water.

In a second aspect of the seventh exemplary embodiment, the at least one alkyl alkoxylate surface active agent generates air bubbles in water when hand-shaken by itself with water in a container.

In an eighth exemplary embodiment, which may be based on the seventh exemplary embodiment above, the invention provides a method wherein components (A) and, (B) are combined with cementitious material in the form of a single additive composition.

In a ninth exemplary embodiment, the invention provides a composition made by any of the methods of the seventh or eighth exemplary embodiments.

In a tenth exemplary embodiment, the invention provides a cementitious composition (e.g., concrete), comprising: a hydratable cement and (A) at least one polycarboxylate ether or ester cement dispersant polymer for plasticizing a hydratable cementitious composition containing the cement, the at least one polycarboxylate ether or ester cement dispersant polymer having a number-average molecular weight less than 10,000, the amount of the at least one polycarboxylate ether or ester cement dispersant polymer being combined in the amount of 0.01-0.20 percent by dry weight based on weight of cement in the cementitious composition (and, more preferably, 0.03-0.15 percent by dry weight based on weight of cement in the cementitious composition; and, most preferably, 0.04-0.1 percent by dry weight based on weight of cement in the cementitious composition); and (B) at least one alkyl alkoxylate surface active agent for modifying air in a hydratable cementitious composition containing the cement, the amount of the at least one alkyl alkoxylate surface active agent being combined in the amount of 0.01-0.15 pounds per cubic yard of cementitious composition (more preferably, 0.03-0.12 pounds per cubic yard of cementitious composition; and, most preferably, 0.05-0.10 pounds per cubic yard of cementitious composition).

In a first aspect of the above-described exemplary embodiments, the at least one alkyl alkoxylate surface active agent can be used in higher amounts as compared to conventional defoamers used in the concrete industry (See e.g., defoamers described in references mentioned in the Background Section). For example, an exemplary additive or cement composition made according to any of the foregoing example embodiments, can contain at least 10% more (based on dry weight percentage compared to polymer weight) of a fully water-miscible alkyl alkoxylate surfactant as compared to conventional, non-fully water-miscible conventional defoamer (e.g., tributyl phosphate), to control the same amount of air within a hydratable cementitious composition.

In a second aspect of the above-described exemplary embodiments, the at least one alkyl alkoxylate surface active agent is fully-water miscible in water and generates a head of foam in water (when incorporated into water by itself and shaken).

In an eleventh exemplary embodiment, which may be based upon any of the foregoing first through tenth exemplary embodiments, the present invention provides an additive composition, method, and cementitious composition involving the use, addition, or inclusion of at least one air entraining agent (AEA). Examples of AEAs were mentioned above.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: R=RL+k*(RU−RL), where k is a variable ranging from 1% to 100% with a 1% increment, e.g., k is 1%, 2%, 3%, 4%, 5% . . . , 50%, 51%, 52% . . . 95%, 96%, 97%, 98%, 99%, or 100%. Moreover, numbers within any numerical range represented by any two values of R, as calculated above, are also specifically disclosed.

EXEMPLIFICATIONS

Reference admixture compositions were made using water-borne, comb-branch polycarboxylate type water reducing admixture in combination with various defoamers or surfactants. The number-average molecular weights of the polymer or polymers, as well as the type and amount of defoamer or surface active agent (surfactant), are listed in Table 1 below. "Reference" admixture compositions employ water reducing admixtures wherein the polycarboxylate-type polymer has a number-average molecular weight exceeding 10,000, and/or otherwise have a conventional defoamer that is not a fully miscible (i.e., they are wholly or partially non-water-soluble) alkyl ether polyalkoxylated type, as identified in Table 1 below. Other the hand, "Sample HRWR 1" and "Sample HRWR 2" are admixtures each containing a high range water reducing polymer having number-average molecular weight below 10,000, as well as an alkyl alkoxylate surface active agent that is fully miscible in water (and would otherwise generate foam if mixed alone in water), as will be shown in the following examples.

TABLE 1

(HRWR Admixtures)

| | Mn of comb-branch polymers | Defoamer or Surfactant type | Solubility of defoamer or surfactant in water | Ratio of defoamer or surfactant to polymer (s/s by weight) |
|---|---|---|---|---|
| Reference 1 | 22,800 and 14,500 | Alkylaminebispropoxylate | No | 0.033 |
| Reference 2 | 15,359 | TiBP, Ethoxlyated oleate | No | 0.015 |
| | | | No | 0.019 |
| Reference 3 | 16,800 and 14,500 | Alkyl polyalkoxylate | Yes | 0.114 |
| Reference 4 | 7334 and 3600 | Alkylaminebispropoxylate | No | 0.048 |
| Sample HRWR 1 | 7334 and 3600 | Alkyl polyalkoxylate | Yes | 0.050 |
| Sample HRWR 2 | 7334 and 3600 | Alkyl polyalkoxylate | Yes | 0.150 |

Example 1

Evaluation of Reference 1 (Prior Art). Concrete (1.25 cubic feet) having 1900 lbs/cyd coarse aggregate meeting the 67 gradation according to ACI guidelines, 730 lbs/cyd cement type I and having a water-to-cement ratio of 0.40 was made in a pan mixer equipped with a planetary blade and continuous air monitoring using an AIRTRAC® air monitoring unit available from GCP Applied Technologies. Three admixtures were used: WRDA® brand water reducer, Type A (3 oz/hundred weight of cement); DARAVAIR® 1000 brand air entraining agent (8.76 oz/cubic yard), both available from GCP applied technologies, and Reference 1, a high range water reducer according to Table 1.

The concrete was assembled in the following order: Recording of the air content was begun immediately and continued throughout the experiment. Stone, sand, water and air-entraining agent were loaded into the mixer and mixed for 1 minute. Cement and Type A water reducer were added at 1 minute, and the concrete was mixed for 2 minutes, then rested for two minutes, then mixed again for two minutes. Slump, air and unit weight were measured on samples removed from the mixer, and the samples were returned into the pan mixer. Thereafter, Reference 1 was added at 15 minutes, and the concrete was mixed for 5 minutes, then stopped for removal of sample, which was measured again at 20 minutes.

The concrete was allowed to rest, without mixing. At 30 minutes, another sample was removed from the pan and tested again. At 38 minutes, the concrete was mixed for two minutes, and then a sample removed for testing again at 40 minutes. The concrete was again allowed to rest until 60 minutes, then was tested without mixing. The concrete was mixed again at 68 minutes, and then after mixing it was tested again at 70 minutes. The air content data are plotted in FIG. 1. As shown in FIG. 1, very steep spikes at 21, 22, 33, 41, and 62 minutes correspond with moments at which the concrete is removed from the mix pan or returned to the pan. After addition of Reference 1 at 15 minutes, the air content changed from about 12% just before addition of Reference 1 to about 18%. At 38 minutes the concrete was mixed with high intensity and the air changes from 9% to almost 20%. A third time, at 68 and 70 minutes, mixing speed is increased (similar to how concrete mixer trucks typically operate at a job site just before pouring), and the air rises from 10% to 19%. Ideally, the air content would not change when the mixing was changed. In addition, the air content should remain constant at rest. The change in air content between 30 minutes and 40 minutes, and between 60 and 70 minutes is a measure of the susceptibility of the concrete to air changes that arises from changes in the mixing process. As illustrated in FIG. 1, Reference 1 does not produce ideal concrete. Air content as measured by Type A air meter is summarized in Table 2.

Figure 2:
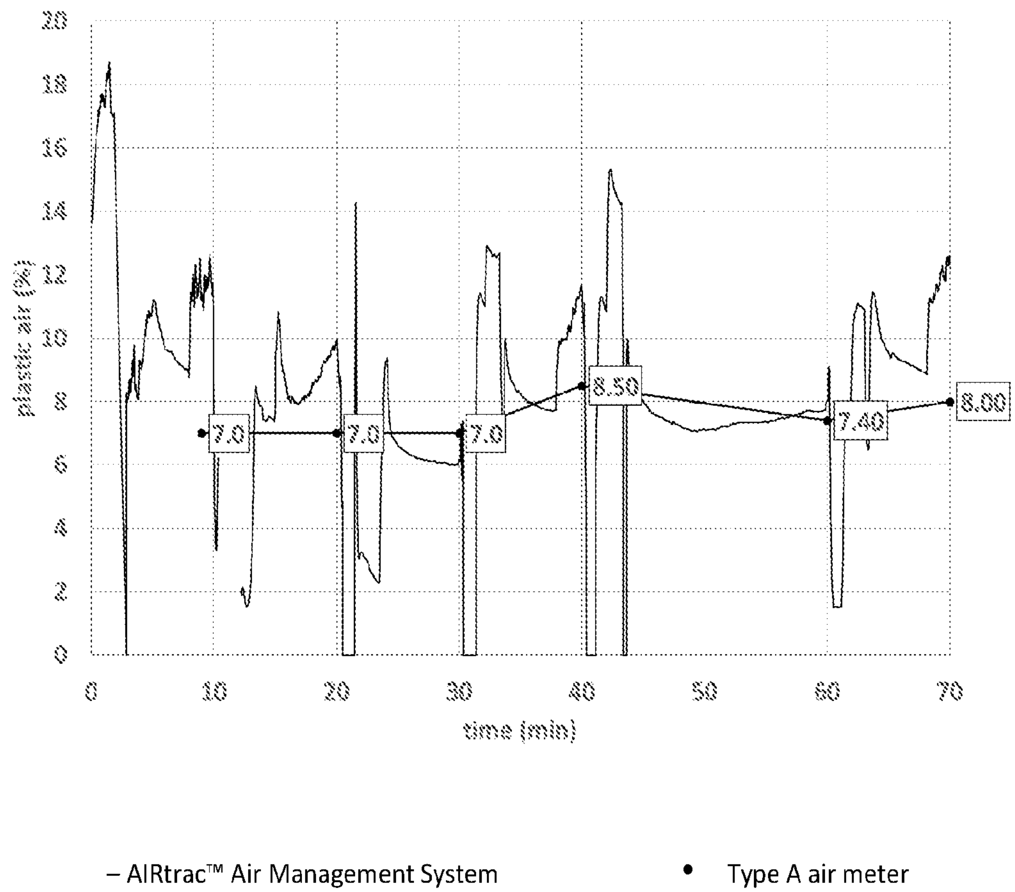
FIG. 2 is another graphic illustration of air content (percentage) of another REFERENCE plastic concrete monitored as a function of time (minutes).

Example 2. Evaluation of Reference 2 (prior art) as described in Table 1 was carried out as for Reference 1, except that the high range water reducer Reference 2 was used. The data are plotted in FIG. 2. As shown in FIG. 2, very steep spikes at 21, 22, 33, 41, and 62 minutes correspond with moments at which the concrete is removed from the mix pan or returned to the. As illustrated in FIG. 2, Reference 2, while an improvement on Reference 1, does not produce ideal concrete. The air content as measured by Type A air meter is summarized in Table 2.

Figure 3:
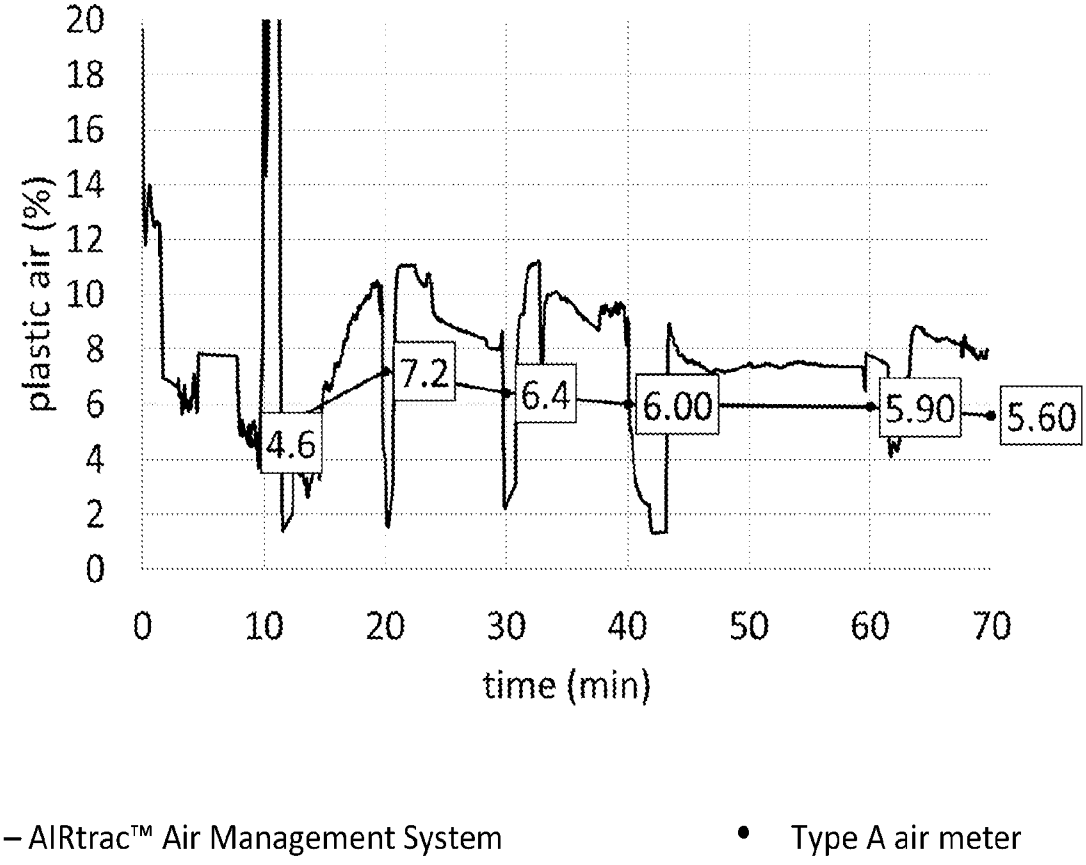
FIG. 3 is a graphic illustration of air content (percentage) of an exemplary plastic cementitious composition, having polycarboxylate dispersant and alkyl alkoxylate surface active agent according to the present invention, monitored over time (minutes).

Example 3. Evaluation of Sample HRWR 1 (an exemplary embodiment of the present invention) as described in Table 1 was carried out similar to that used in Reference 1, except that the high range water reducer Sample HRWR 1 was used (e.g., containing the low molecular weight polymer and fully miscible surface active agent). The data are plotted in FIG. 3. As illustrated in FIG. 3, Sample 1 produces concrete that is very close to ideal. The steep spikes at 21, 22, 33, 41, and 62 minutes, correspond to removal of the concrete mix from the pan or return of the concrete to the pan. Between 38 and 40 minutes, the concrete is mixed at high intensity, and air content is seen to be relatively steady at around 10%. At 68 to 70 minutes, the mixing rate is increased, similar to preparing for a pour at a job site; and the air content appears to be relatively constant, perhaps with only a slight or gradual decrease, as compared to FIG. 1 and FIG. 2. Air content as measured by Type A air meter is summarized in Table 2.

The data illustrated in FIG. 1, FIG. 2, and FIG. 3 are summarized in Table 2, where it can be seen that the air content of concrete made using Sample HRWR 1 (example embodiment of present invention) was more stable than that of the two Reference samples (prior art).

TABLE 2

(Comparative Testing)

| HRWR tested | Air (30 min) | Air (40 min) | Air (60 min) | Air (70 min) |
|---|---|---|---|---|
| Reference 1 | 10.5 | 12 | 11 | 12.5 |
| Reference 2 | 7 | 8.5 | 7.4 | 8 |
| Sample HRWR 1 | 6.4 | 6 | 5.9 | 5.6 |

Example 4

Figure 4:
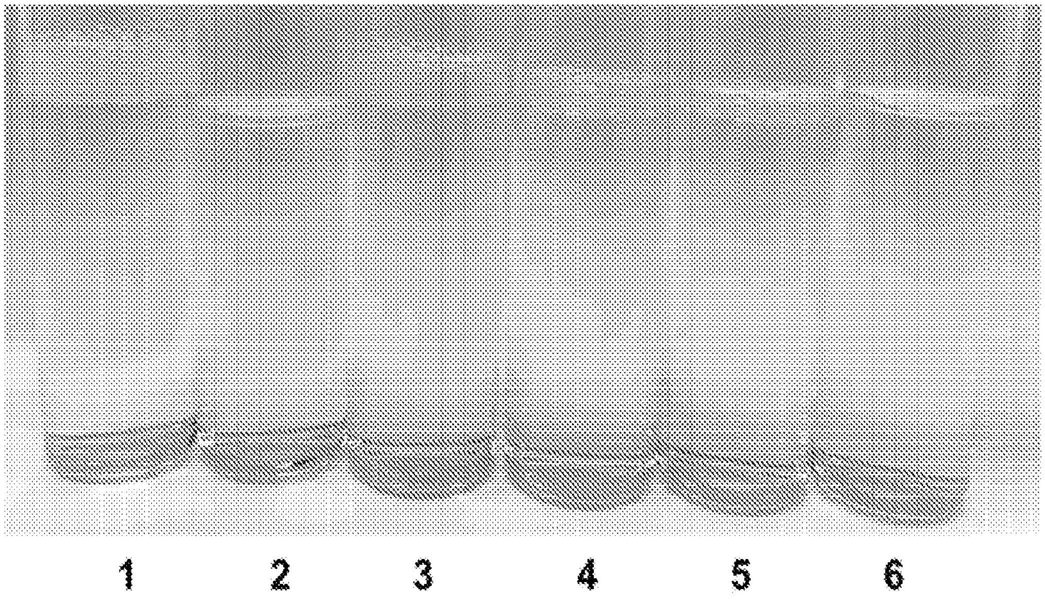
FIG. 4 is a photograph of six surface active agents found to be miscible in water.

Solubility of Surfactants. The inventors tested surface active agents from the alkyl ether alkoxylate family by mixing into water to evaluate solubility. Testing of these agents was done at 25%, 50%, and 75% surfactant-to-water ratio (dry weight based on water). FIG. 4 is a photograph of six samples mixed into water at surfactant-to-water ratio of 50% according to Table 3 below. Sample 6 (Pluronic™ L-64 surfactant from BASF) is not an alkyl alkoxylate and is not considered by the present inventors to be suitable for the present invention, although it is water-soluble. The alkyl alkoxylate surfactants are listed in Table 3 below.

TABLE 3

(alkyl alkoxylate type surfactants)

| Sample | Surface Active Agent |
|---|---|
| 1 | Alkonat™ L120 from Oxeteno |
| 2 | Biosoft™ E647 from Stepan |
| 3 | Libranone™ 13/120 from Libra Specialty Chemicals |
| 4 | Ethox™ 2680 from Ethox Corporation |
| 5 | Ethox™ 2400 from Ethox Corporation |

Example 5

Figure 5:
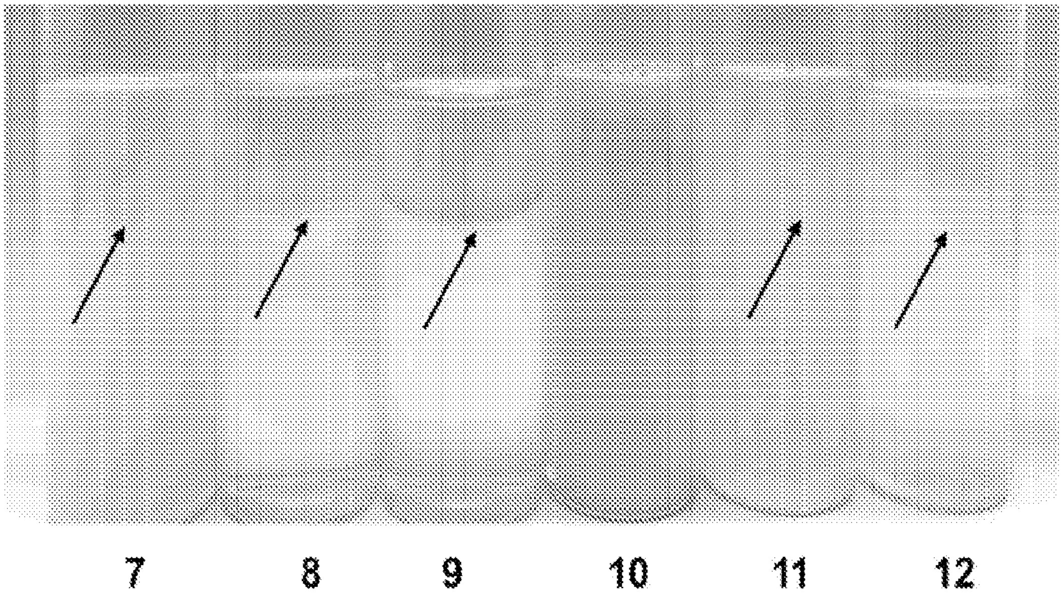
FIG. 5 is a photograph of six REFERENCE surface active agents in water.

Testing Solubility/Insolubility of Defoamers. Defoamers that are not soluble in water demonstrate their lack of full miscibility through perceptible phase separation or visible cloudiness (e.g., turbidity as perceived by the unaided human eye) as shown in FIG. 5. The photograph of FIG. 5 shows various defoamer samples at a defoamer-to-water ratio of 25%. As indicated by the arrows, a phase boundary can be seen in reference samples 7, 8, 9, and 11, indicating lack of miscibility. Turbidity, in the form of cloudiness, can be seen in reference sample 10. Turbidity is also a visual indicator for lack of full miscibility. Reference samples 7-11, as used for generating samples shown in FIG. 5, contained conventional defoamers as identified in Table 4 below.

TABLE 4

(Reference Non-Miscible Defoamers).

| Ref. | Defoamer Trade Name/Source | Defoamer class |
|---|---|---|
| 7 | Foam Blast® 476 defoamer from Dystar L. P. | Alkyl ester alkoxylate |
| 8 | Tri-isobutyl phosphate defoamer from Lanxess | Phosphate ester |
| 9 | Phosflex® 4 defoamer from ICI AP America | Phosphate ester |
| 10 | Melflux® DF 93 defoamer from BASF | Alkylene glycol |
| 11 | Propomeen® T/12 defoamer from Akzo-Nobel | Tallow amine ethoxlyate |
| 12 | Surfynol 255 from Evonik | Acetylene diol ethoxylate |

Example 6

Figure 6:
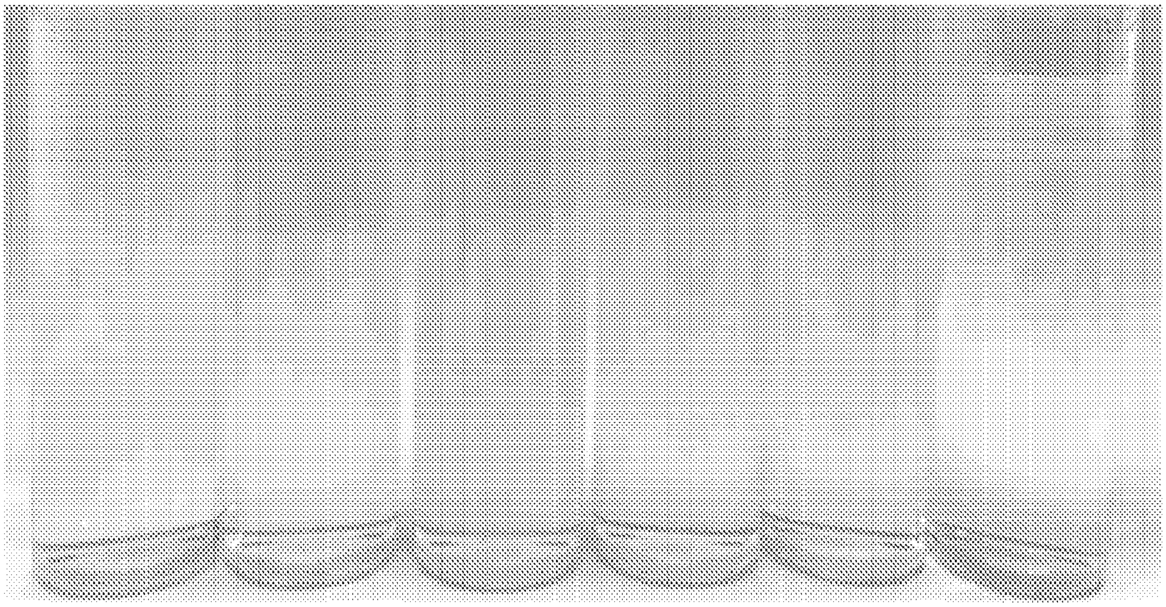
FIG. 6 is a photograph of the surface active agents used in FIG. 4, shown after mixing by shaking in glass containers, in which a head of foam was seen generated (thus the unexpected discovery that such agents could be used for controlling air content arising from the use of polycarboxylate-type dispersants which otherwise tend to entrap air within the concrete).

Foaming Ability of surfactants. The surface active agents used in Example 4, which were found to be fully-miscible in water as shown in FIG. 4, were mixed into water by hand-shaking in glass containers. FIG. 6 is a photograph of the various containers.

The present inventors were immediately surprised to see tiny air bubbles, or the formation of a head of foam in the shaken samples. It was indeed quite unexpected that materials that generate heads of foam in water could work to control air generated in polycarboxylate-type cement dispersant polymers in concrete mixes.

Example 7

Figure 7:
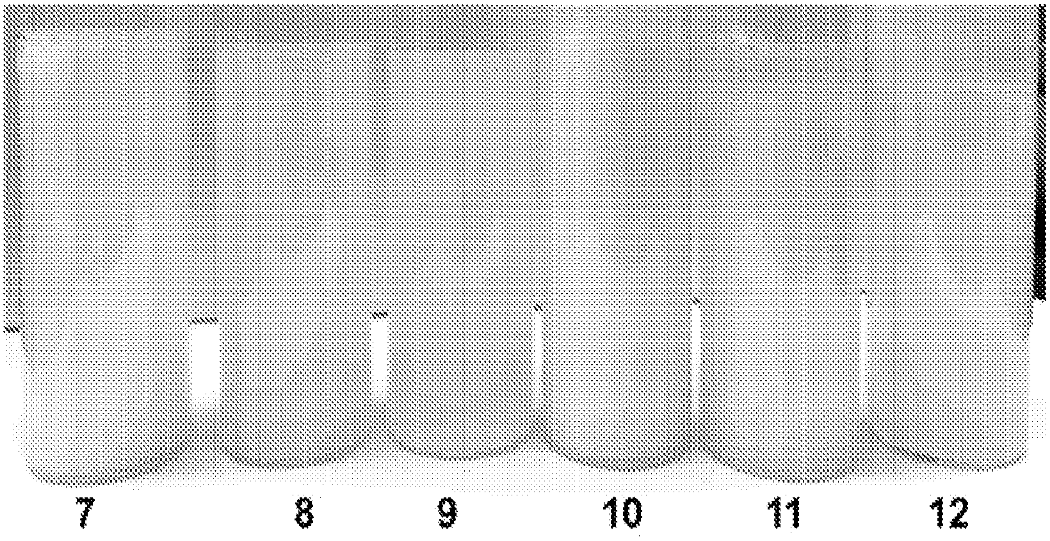
FIG. 7 is a photograph of surface active agents in FIG. 5, shown after mixing by shaking, showing no foam layer being generated but instead a cloudiness (or "milkiness") due to insolubility (or non-miscibility) of the surface active agents.

Foaming ability of defoamers. The defoamers agents used in Example 3, were found not to be fully water-miscible. As shown in the photographs of FIG. 5, the agents were mixed with water in glass containers by shaking. FIG. 7 is a photograph of the various containers. None of the Reference conventional defoamers generated a foam. Instead, the mixtures were seen as "milky" or cloudy, evidencing a perceptible lack of full water-miscibility.

Example 8

Evaluation of References 1, 3, and 4 (prior art) and Sample HRWR 2 (Exemplary embodiment of present invention). Concrete (1.25 cubic feet) having 1900 lbs/cyd coarse aggregate meeting the 67 gradation according to ACI guidelines, 730 lbs/cyd cement type 1 and having a water-to-cement ratio of 0.39 was made in a tumble mixer. Three admixtures were used: WRDA™ 64 Type A water reducer (3 oz/hundred weight of cement) and Daravair® 1000 air entraining agent (6.21 oz/cubic yard), both available from GCP applied technologies, and a high range water reducer according to Table 1—Reference 1, Reference 3, Reference 4 and Sample HRWR 2. The concrete was made using components mixed in the following order: Stone, sand, water and air-entraining agent were loaded into the mixer and mixed for 1 minute at 18- 20 rpm (intense mixing). Cement was added at 1 minute, Type A water reducer at 2 minutes, and the concrete was mixed for 3 minutes at 18-20 rpm, rested for two minutes, then mixed again for two minutes at 18-20 rpm. Slump, air and unit weight were measured on samples removed from the mixer, which were returned before proceeding. The high range water reducer according to Table 1 was added at 15 minutes, and the concrete was mixed for 5 minutes, before stopping to remove a sample, then measured again at 20 minutes. The concrete was mixed slowly (2-4 rpm). At 30 minutes, a sample of concrete was tested again in the air pot in accordance with ASTM C231/231M-17a. At 38 minutes, the concrete was mixed at 18-20 rpm for two minutes, then sampled again at 40 minutes. The concrete was again mixed at 2-4 rpm until 60 minutes, when the concrete was tested for slump, air and unit weight without increasing the mixing speed. The concrete was mixed at 18-20 rpm again at 68 minutes and tested again for slump, air and unit weight at 70 minutes, after having been mixed for two minutes.

Ideal concrete would have very little variation in the air content. The difference between 9 and 20 minutes is the difference in air before and after adding the HRWR. The differences between the concrete state at 30 and 40 minutes, and at 60 and 70 minutes, appear to be the tendency of the concrete to gain air with intense mixing, as in batching and after adding water to the concrete. The difference at 40 and 60 minutes is the loss of air with slow mixing, which the present inventors believe occurs in the concrete delivery truck drum during transit (where drum rotational speed is usually kept between 1-4 rpm. One way to evaluate this is to sum up the differences into an Air Stability Index, or ASI. Low ASI values indicate more stable air and are more desirable. The following variables are defined: A=plastic air (%) at 9 minutes, before HRWR addition. B=plastic air (%) at 20 minutes, after addition of HRWR and 5 minutes of intense mixing. C=plastic air (%) at 30 minutes, slow mixing only. D=plastic air (%) at 40 minutes after 2 minutes of high drum speed mixing. E=plastic air (%) at 60 minutes with slow mixing only. F=plastic air (%) at 70 minutes with 2 minutes of high drum speed mixing.

Air Stability Index, or ASI, is the sum of the absolute value (e.g., |x| is the absolute value of x) of the differences, with the exception that F-A term retains its sign-gain of air over time is much worse than loss of air over time, which is expected and can be can be calculated using the following equation: $ASI=|B-A|+|D-C|+|F-E|+|E-D|+F-A$ The ASI is shown below in Table 2, for each material evaluated in Example 2. Sample 2 had the lowest ASI, and contained a polymer with less than 10,000 Mn (number average molecular weight) and alkyl alkoxylate surfactant according to the invention.

TABLE 5

| | 9 spin | 20 spin | 30 no spin | 40 spin | 60 no spin | 70 spin | ASI |
|---|---|---|---|---|---|---|---|
| Reference 1 | 5.3 | 8.5 | 7.3 | 8.5 | 6.6 | 7.8 | 10.0 |
| Reference 3 | 5.3 | 5.0 | 3.6 | 4.5 | 2.0 | 4.3 | 5.0 |
| Reference 4 | 4.9 | 9.2 | 7.9 | 9.3 | 5.4 | 9.0 | 17.3 |
| Sample 2 | 5.0 | 5.6 | 4.5 | 5.4 | 4.1 | 4.5 | 2.7 |

The foregoing example and embodiments were present for illustrative purposes only and not intended to limit the scope of the invention.

We claim:

1. A cementitious composition comprising cement, aggregates, and an additive composition comprising:

(A) at least one polycarboxylate ether or ester dispersant polymer for plasticizing a hydratable cementitious composition, the at least one polycarboxylate ether or ester dispersant polymer having a number-average molecular weight less than 10,000 Daltons and being present in the amount of 10-50 percent by dry weight based on total weight of the additive composition;

(B) at least one alkyl alkoxylate surface active agent comprising $C_8$-$C_{14}$ branched or linear alkyl chains and 8-20 alkylene oxide groups, and is present in an amount of 2-30 percent by weight based on the weight of the at least one polycarboxylate ether or ester dispersant; and (C) water in an amount sufficient to carry the at least one polycarboxylate ether or ester cement dispersant polymer and the at least one alkyl alkoxylate surface active agent together in the form of a liquid additive composition, wherein the at least one alkyl alkoxylate surface active agent is fully water-soluble, and wherein the at least one polycarboxylate ether or ester dispersant polymer is obtained by copolymerizing monomer components (a), (b), (c), and, optionally, (d):

(a) a first polyoxyalkylene monomer represented by structural formula:

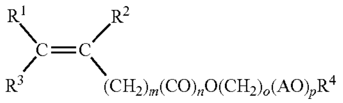

wherein $R^1$ and $R^2$ individually represent hydrogen atom or methyl group; $R^3$ represents hydrogen or —COOM group wherein M represents a hydrogen atom or an alkali metal; AO represents oxyalkylene group having 2 to 4 carbon atoms or mixtures thereof; "m" represents an integer of 0 to 2; "n" represents an integer of 0 or 1; "o" represents an integer of 0 to 4; "p" represents an average number of oxyalkylene groups and is an integer from 5 to 35; and $R^4$ represents a hydrogen atom or $C_1$ to $C_4$ alkyl group;

(b) a second polyoxyalkylene monomer represented by structural formula:

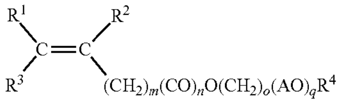

wherein $R^1$ and $R^2$ individually represent hydrogen atom or methyl group; $R^3$ represents hydrogen or —COOM group wherein M represents a hydrogen atom or an alkali metal; AO represents an oxyalkylene group having 2 to 4 carbon atoms or mixtures thereof; "m" represents an integer of 0 to 2; "n" represents an integer of 0 or 1; "o" represents an integer of 0 to 4; "g" represents an average number of oxyalkylene groups and is an integer from 20 to 200; and $R^4$ represents a hydrogen atom or $C_1$ to $C_4$ alkyl group;

(c) an unsaturated carboxylic acid monomer represented by structural formula:

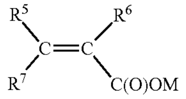

wherein $R^5$ and $R^6$ individually represent hydrogen atom or methyl group; $R^7$ represents hydrogen atom, $C(O)OR^8$, or C(O)NH $R^8$ wherein $R^8$ represents a $C_1$ to $C_4$ alkyl group, and M represents a hydrogen atom or an alkali metal; and, optionally, (d) an unsaturated, water-soluble monomer represented by structural formula:

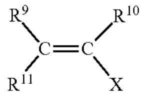

wherein $R^9$, $R^{10}$, and $R^{11}$ each independently represent a hydrogen atom, methyl group or C(O)OH; X represents $C(O)NH_2$, $C(O)NHR^{12}$, $C(O)NR^{13}R^{14}$, O—$R^{15}$, $SO_3H$, $C_6H_4SO_3H$, or $C(O)NHC(CH_3)_2CH_2SO_3H$, or mixture thereof, wherein R12, R13, R14, and $R^{15}$ each independently represent a $C_1$ to $C_5$ alkyl group; and wherein the molar ratio of component (a) to component (b) is from 15:85 to 85:15, wherein the molar ratio of component (c) to the sum of component (a) and component (b) is 90:10 to 50:50, and further wherein the amount of the at least one alkyl alkoxylate surface active agent is present in the amount of 0.01-0.15 pounds per cubic yard of the cementitious composition.

2. The cementitious composition of claim 1 further comprising at least one air entraining agent.

3. The cementitious composition of claim 1 wherein the at least one polycarboxylate ether or ester cement dispersant polymer is present in the amount of 0.03-0.15 percent by dry weight based on weight of cement in the cementitious composition.

4. The cementitious composition of claim 3 wherein the at least one polycarboxylate ether or ester cement dispersant polymer is present in the amount of 0.04-0.10 percent by dry weight based on weight of cement in the cementitious composition.

5. The cementitious composition of claim 1 wherein the at least one alkyl alkoxylate surface active agent is present in the amount of 0.03-0.12 percent by dry weight based on weight of cement in the cementitious composition.

6. The cementitious composition of claim 5 wherein the at least one alkyl alkoxylate surface active agent is present in the amount of 0.05-0.10 percent by dry weight based on weight of cement in the cementitious composition.

* * * * *